United States Patent
De Clercq

(10) Patent No.: US 11,223,293 B2
(45) Date of Patent: Jan. 11, 2022

(54) SYNCHRONOUS FLYBACK CONVERTER CIRCUIT FOR OPERATING AN ILLUMINANT LINE

(71) Applicant: TRIDONIC GMBH & CO KG, Dornbirn (AT)

(72) Inventor: Ludwig Erasmus De Clercq, Dornbirn (AT)

(73) Assignee: Tridonic GmbH & Co KG, Dornbirn (AT)

(*) Notice: Subject to any disclaimer, the term of this patent is extended or adjusted under 35 U.S.C. 154(b) by 0 days.

(21) Appl. No.: 17/059,791

(22) PCT Filed: Jun. 17, 2019

(86) PCT No.: PCT/EP2019/065846
§ 371 (c)(1),
(2) Date: Nov. 30, 2020

(87) PCT Pub. No.: WO2019/243239
PCT Pub. Date: Dec. 26, 2019

(65) Prior Publication Data
US 2021/0212182 A1    Jul. 8, 2021

(30) Foreign Application Priority Data
Jun. 21, 2018   (DE) .................... 10 2018 114 926.3

(51) Int. Cl.
*H02M 3/335* (2006.01)
*H05B 45/385* (2020.01)
(Continued)

(52) U.S. Cl.
CPC ....... *H02M 3/33592* (2013.01); *H02M 1/083* (2013.01); *H05B 45/385* (2020.01); *H02M 1/0009* (2021.05)

(58) Field of Classification Search
CPC ......... H02M 3/33507; H02M 3/33523; H02M 3/33592; H02M 1/08; H02M 3/33515;
(Continued)

(56) References Cited

U.S. PATENT DOCUMENTS

2010/0110732 A1   5/2010   Moyer et al.
2011/0080110 A1*  4/2011   Nuhfer ................. H05B 45/44
                                                  315/291
(Continued)

FOREIGN PATENT DOCUMENTS

| EP | 3307022 | 4/2018 |
| WO | 2015065603 | 5/2015 |
| WO | 2018087302 | 5/2018 |

OTHER PUBLICATIONS

Search report dated Sep. 19, 2019 in parent application PCT/EP2019/065846.

*Primary Examiner* — Wei (Victor) Y Chan
(74) *Attorney, Agent, or Firm* — Andrus Intellectual Property Law, LLP

(57) ABSTRACT

The present invention relates to a synchronous flyback converter circuit (1) for operating an illuminant line (4) having at least one illuminant (5), more particularly having at least one light emitting diode, the synchronous flyback converter circuit (1) comprising: a transformer (T), having a primary winding (Np), which is electrically connected to a first switch (S1), and a secondary winding (Ns), which is electrically connected to an output (A1, A1') of the synchronous flyback converter circuit via a second switch (S2), the illuminant line (4) being able to be connected to the output; and a control unit (2), which is designed to control the first switch (S1) and the second switch (S2). According to a first embodiment according to the invention, the synchronous flyback converter circuit (1) comprises a sensing circuit (3), (Continued)

which is designed to capture a temporal mean of the switch current (IS1) flowing through the first switch (Si) and to feed at least one signal (Sg) conveying said temporal mean to the control unit (2), the control unit (2) being designed to separately determine, on the basis of the signal (Sg) fed from the sensing circuit (3), a temporal mean of the positive component of the switch current (IS1) flowing through the first switch (Si) and a temporal mean of the negative component of the switch current (IS1) flowing through the first switch (S1). According to a second embodiment according to the invention, the synchronous flyback converter circuit (1) comprises a sensing circuit (3), which is designed to separately capture a temporal mean of the positive component of the switch current (IS1) flowing through the first switch and a temporal mean of the negative component of the switch current (IS1) flowing through the first switch and to feed a first signal conveying the temporal mean of the negative component of the switch current (IS1) and a second signal conveying the temporal mean of the positive component of the switch current (IS1) to the control unit (2).

11 Claims, 3 Drawing Sheets

(51) Int. Cl.
*H02M 1/08* (2006.01)
*H02M 1/00* (2006.01)

(58) Field of Classification Search
CPC .. H02M 1/0009; H02M 1/0058; H02M 3/003; H02M 7/003; H02M 7/2176
See application file for complete search history.

(56) References Cited

U.S. PATENT DOCUMENTS

| | | | |
|---|---|---|---|
| 2014/0092646 A1 | 4/2014 | Cleveland et al. | |
| 2015/0130372 A1* | 5/2015 | Chitta | H02M 3/33569 |
| | | | 315/307 |
| 2016/0172962 A1 | 6/2016 | Chen et al. | |
| 2018/0083541 A1* | 3/2018 | Liang | H02M 3/33553 |
| 2020/0375002 A1* | 11/2020 | Das | H05B 45/38 |

* cited by examiner

SYNCHRONOUS FLYBACK CONVERTER CIRCUIT FOR OPERATING AN ILLUMINANT LINE

CROSS REFERENCE TO RELATED APPLICATIONS

The present application is the U.S. national stage application of international application PCT/EP2019/065846 filed Jun. 17, 2019, which international application was published on Dec. 26, 2019 as International Publication WO 2019/243239 A1. The international application claims priority to German Patent Application 10 2018 114 926.3 filed Jun. 21, 2018.

FIELD OF THE INVENTION

The present invention relates to synchronous flyback converter circuits for operating an illuminant line with at least one illuminant, in particular with at least one light-emitting diode; a luminaire having one of such synchronous flyback converter circuits according to the invention and an illuminant line with at least one illuminant, in particular with at least one light-emitting diode; and also to methods for operating in each case one of such synchronous flyback converter circuits according to the invention.

BACKGROUND

A flyback converter, also called a buck-boost converter, is an input-side actively clocked DC/DC converter or primary-clocked DC/DC converter which galvanically decouples or isolates (i.e., electrically isolates) electrical energy between an input side or primary side and an output side or secondary side by means of a transformer. With a flyback converter, a DC voltage fed to the input can be converted into a DC voltage with a different voltage level.

A flyback converter circuit for operating an illuminant line with at least one illuminant therefore comprises a primary-side controllable switch and a transformer with a primary winding, which is electrically connected to the switch, and with a secondary winding. The output of the flyback converter circuit is electrically connected to the secondary winding via a diode, the secondary-side diode serving for half-wave rectification.

It is now known from the prior art to replace the secondary-side diode by a secondary-side controllable switch, whereby a higher efficiency (lower electrical power losses) can be achieved. A flyback converter or a flyback converter circuit with a secondary-side switch instead of a diode for secondary-side rectification is also referred to as a synchronous flyback converter or synchronous flyback converter circuit. Consequently, in a synchronous flyback converter or in a synchronous flyback converter circuit, the secondary winding of the transformer is electrically connected to the output of the flyback converter circuit via a secondary-side switch.

Hereinafter, the primary-side switch will be referred to as the first switch and the secondary-side switch as the second switch.

In order to generate an output-side current for the operation of the illuminant line, in the case of a synchronous flyback converter circuit, the first switch and the second switch are operated alternately in the conductive state by a corresponding control unit. In particular, in order to reach a dimming level specified by a dimming signal, the first and second switches are operated alternately in the conductive state in accordance with the dimming signal.

If, during the on duration of the first switch, the first switch is in the conductive state and the second switch is in the non-conductive state, then, on the primary side of the synchronous flyback converter circuit, a current flows through the primary winding of the transformer and the conductive first switch, which is supplied by a supply voltage fed to the input, and electrical energy is stored in the primary winding. If the first switch is switched to non-conductive and the second switch is switched to conductive, then the electrical energy stored in the primary winding is transmitted to the secondary winding of the transformer. Consequently, during the on duration of the second switch (first switch non-conductive and second switch conductive), a current flows on the secondary side from the secondary winding via the conductive second switch to the illuminant line connected to the output. This current then consequently corresponds to the current provided on the output side by the synchronous flyback converter circuit for the operation of the illuminant line.

In order to dim the illuminant line, the temporal mean of the current which is fed on the output side to the illuminant line by the synchronous flyback converter circuit must be reduced. The lower or smaller the dimming level, the lower or less is the brightness of the light emitted by the illuminant line.

In order to achieve very low dimming levels, i.e., very low brightnesses, a correspondingly very small temporal mean of the current fed to the illuminant line must be achieved. Since the current supplied to the illuminant line corresponds to the current flowing through the secondary winding of the transformer of the synchronous flyback converter circuit, the temporal mean of the current flowing through the secondary winding or of the current provided on the output side via the transformer of the synchronous flyback converter circuit must therefore be set correspondingly small.

For this purpose, in the alternating clocking of the first and second switches, the on duration of the second switch can be dimensioned such that, during the on duration of the second switch, the polarity of the current flowing through the secondary winding and second switch changes from a positive polarity to a negative polarity and consequently the voltage at the secondary winding reverses, i.e., for example, from a positive polarity to a negative polarity or with respect to another reference voltage, such as a bus voltage. This means that the second switch is operated in the conductive state until the direction of the current flowing through the secondary winding reverses. When the first switch is subsequently switched on, the switch current flowing through the first switch then has a negative component and a positive component.

In that the current flowing through the secondary winding has a negative polarity at least temporarily, a particularly small temporal mean of the current flowing through the secondary winding can be achieved. The synchronous flyback converter circuit can thereby output on the output side a small current for the illuminant line. Accordingly, correspondingly low brightnesses of the light radiated by the illuminant line can be achieved for corresponding dimming signals for the illuminant line.

In order to regulate the electrical energy provided at the output by a synchronous flyback converter circuit or the current provided at the output for operating an illuminant line connected to the output of the synchronous flyback converter circuit with at least one illuminant, it is typically necessary to collect information relating to the temporal mean of the current (illuminant line current) flowing on the secondary side through the illuminant line connected to the output and feed it to the corresponding control unit provided for clocking the first and second switches.

A direct measurement of the illuminant line current on the secondary side is disadvantageous since the potential of the secondary side and the potential of the primary side are galvanically isolated from each other and a re-transmission of the measurement result from the secondary side to the primary side to the control unit consequently has to take place in an electrically isolated manner. This requires additional components, such as an optocoupler, which increases the size of the synchronous flyback converter circuit, i.e., it takes up more space. This is particularly disadvantageous with regard to an integration of the synchronous flyback converter circuit.

It is also important that the additional components make the synchronous flyback converter circuit more complex and expensive to produce.

Furthermore, in the operation of the synchronous flyback converter circuit described above for reaching a very low dimming level, a very complex and cost-intensive detection circuit is required for capturing the temporal mean of the current provided on the output side to the illuminant line by the synchronous flyback converter circuit since a very low dimming level is reached by a very small temporal mean of the current provided on the output side. Consequently, capture of this temporal mean can be easily falsified by noise.

It is therefore an object of the present invention to provide a synchronous flyback converter circuit for operating an illuminant line with at least one illuminant, in which information relating to the temporal mean of the secondary-side current flowing through the illuminant line when the latter is connected to the output of the synchronous flyback converter circuit can be collected in a space-saving and cost-effective manner. In particular, it is a further object of the present invention that in such a synchronous flyback converter circuit, a less complex (for example, space-saving) and cost-effective capture can also take place at very low dimming levels of the illuminant line.

These and other objects, which will be mentioned during reading of the following description or which can be recognized by a person skilled in the art, are achieved by the subject-matter of the independent claims. The dependent claims develop the central idea of the present invention in a particularly advantageous manner.

The synchronous flyback converter circuit achieves the above objects since by means of a primary-side capture of a temporal mean of the switch current flowing through the first switch and by means of a primary-side separate determination, undertaken on the basis of this capture, of the temporal mean of the positive component of the switch current flowing through the first switch and of the temporal mean of the negative component of the switch current flowing through the first switch, information relating to the temporal mean of the current flowing on the secondary side and consequently of the illuminant line current can be collected in a space-saving and cost-effective way when the illuminant line is connected to the synchronous flyback converter circuit. This is because a combination of the temporal mean of the positive component of the switch current and the temporal mean of the negative component of the switch current can be used to determine the actual temporal mean of the switch current, which allows a conclusion to be drawn about the actual temporal mean of the secondary-side current.

The same applies to the corresponding method according to the invention.

The synchronous flyback converter circuit also achieves the above object since by means of a primary-side separate capture of the temporal mean of the positive component of the switch current flowing through the first switch and of the temporal mean of the negative component of the switch current flowing through the first switch, information relating to the temporal mean of the current flowing on the secondary side and consequently of the illuminant line current can be collected in a space-saving and cost-effective way when the illuminant line is connected to the synchronous flyback converter circuit. This is because a combination of the temporal mean of the positive component of the switch current and the temporal mean of the negative component of the switch current can be used to determine the actual temporal mean of the switch current, which allows a conclusion to be drawn about the actual temporal mean of the secondary-side current.

The same applies to the corresponding method according to the invention.

DETAILED DESCRIPTION OF THE INVENTION

According to a first embodiment of the present invention, a synchronous flyback converter circuit is provided for operating an illuminant line with at least one illuminant, in particular with at least one light-emitting diode; wherein the synchronous flyback converter circuit comprises:

a transformer having a primary winding, which is electrically connected to a first switch, and a secondary winding, which is electrically connected to an output of the synchronous flyback converter circuit via a second switch, the illuminant line being connectable at the output, a control unit designed to control the first switch and second switch, and a detection circuit designed to capture a temporal mean of the switch current flowing through the first switch and to feed at least one signal representing this temporal mean to the control unit;

wherein the transformer galvanically isolates a primary side of the synchronous flyback converter circuit on which the primary winding, the first switch, the control unit and the detection circuit are arranged from a secondary side of the synchronous flyback converter circuit on which the secondary winding, the second switch and the output are arranged; and wherein the control unit is designed to separately determine a temporal mean of the positive component of the switch current flowing through the first switch and a temporal mean of the negative component of the switch current flowing through the first switch on the basis of the signal fed from the detection circuit.

In other words, the present invention proposes, in a first embodiment of the synchronous flyback converter circuit according to the invention, that a temporal mean of the switch current flowing through the first switch be captured and a signal representing this temporal mean be fed to the control unit, which can then separately determine a temporal mean of the positive component of the switch current and a temporal mean of the negative component of the switch current on the basis of the supplied signal.

Consequently, the first embodiment of the synchronous flyback converter circuit according to the invention is advantageous since, by means of a primary-side capture and evaluation of the temporal mean of the switch current flowing through the first switch, information relating to the average current flowing on the secondary side can be collected without an electrically isolated re-transmission from the secondary side to the primary side being necessary for this purpose.

Furthermore, even at a very low dimming level, the actual temporal mean of the switch current flowing through the first switch can be inexpensively captured by combining the determined temporal mean of the positive component of the switch current and the determined temporal mean of the negative component of the switch current. At a very low dimming level, the temporal mean of the positive component of the switch current and the temporal mean of the negative component of the switch current are in fact much higher than the temporal mean of the entire switch current so that a signal representing the temporal mean of the positive component of the switch current and a signal representing the temporal mean of the negative component of the switch current has a much better signal-to-noise ratio (SNR) than the signal captured by the detection circuit, which represents the temporal mean of the entire switch current. For this reason, the temporal mean of the switch current captured by the detection circuit (in particular in the case of a very low dimming level and consequently a very small temporal mean of the switch current) may differ from the actual temporal mean of the switch current due to noise which may be present in the case of inexpensive capture.

However, the actual temporal mean of the switch current can be ascertained, in particular determined, on the basis of the separately determined temporal mean of the positive component of the switch current and the temporal mean of the negative component of the switch current since these two separately determined temporal means are not falsified by noise which may be present in the case of inexpensive capture.

A separate determination of the temporal mean of the positive component and the temporal mean of the negative component of the switch current flowing through the first switch is understood to mean that the temporal mean of the positive component of or positive contribution to the switch current can be determined independently of the temporal mean of the negative component of or negative contribution to the switch current, and that correspondingly the temporal mean of the negative component of the switch current can be determined independently of the temporal mean of the positive component of the switch current.

The switch current flowing through the first switch is understood to mean the current which flows through the first switch when it is in the conductive state or is switched on. Since the first switch is electrically connected to the primary winding, the current flowing through the primary winding in the conductive state of the first switch corresponds to the switch current.

The positive component of the switch current preferably corresponds to a positive current which flows through the first switch in the conductive state; and the negative component of the switch current preferably corresponds to a negative current which flows through the first switch in the conductive state.

With regard to the positive component, the negative component of the switch current corresponds in particular to a current return flow through the first switch.

The positive component of the switch current preferably corresponds to a current which flows from the higher-potential input terminal of the synchronous flyback converter circuit through the primary winding of the transformer and the first switch in the conductive state to the lower-potential input terminal. The negative component of the switch current preferably corresponds to a current which flows from the lower-potential input terminal of the synchronous flyback converter circuit through the first switch in the conductive state and the primary winding of the transformer to the higher-potential input terminal.

As already explained above, the transformer separates or decouples a primary side of the synchronous flyback converter circuit from a secondary side of the synchronous flyback converter circuit so that there is galvanic isolation between the input and the output of the synchronous flyback converter circuit. The synchronous flyback converter circuit is thus designed to transmit in an electrically isolated manner electrical energy between its primary side (can also be referred to as the input side) and its secondary side (can also be referred to as the output side) by means of the transformer.

As already explained above, a "synchronous flyback converter circuit" is understood in particular to mean a "normal" flyback converter circuit in which the at least one secondary-side diode used for rectification is replaced by at least one controllable secondary-side switch.

The control unit is preferably designed to control or clock the first switch and the second switch alternately. In other words, when the first switch is switched to conductive, the second switch is preferably switched to non-conductive; and when the first switch is switched to non-conductive, the second switch is preferably switched to conductive.

In order to generate an output-side current for the operation of the illuminant line, the control unit of the synchronous flyback converter circuit according to the invention is therefore preferably designed to operate the first switch and second switch alternately in the conductive state. In particular, the control unit is designed to operate the first switch and second switch alternately and periodically in the conductive state.

In order to reach a dimming level specified by a dimming signal, the control unit is preferably designed to operate the first and second switches alternately in the conductive state in accordance with the dimming signal. In order to reach a dimming level specified by a dimming signal, the control unit is in particular designed to operate the first and second switches alternately and periodically in the conductive state in accordance with the dimming signal.

If, during the on duration of the first switch, the first switch is in the conductive state or is conducting and the second switch is in the non-conductive state or is not conducting, then on the primary side of the synchronous flyback converter circuit, a current flows through the primary winding of the transformer and the conductive first switch, which is supplied by a supply voltage fed to the input, and electrical energy is stored in the primary winding. If the first switch is switched to non-conductive and the second switch is switched to conductive, then the electrical energy stored in the primary winding is transmitted to the secondary winding of the transformer. Consequently, during the on duration of the second switch (first switch non-conductive and second switch conductive), a current flows on the secondary side from the secondary winding via the conductive second switch to the illuminant line connected to the output. This current then consequently corresponds to the current provided on the output side by the synchronous flyback converter circuit for the operation of the illuminant line.

In order to dim the illuminant line, the temporal mean of the current which is provided by the synchronous flyback converter circuit on the output side to the illuminant line must be reduced. The lower or smaller the dimming level, the lower or less is the brightness of the light emitted by the illuminant line.

In order to achieve very low dimming levels, i.e., very low brightnesses, a correspondingly very small temporal mean of the current provided on the output side to the illuminant line must be achieved. Since the current provided on the output side to the illuminant line corresponds to the current flowing through the secondary winding of the transformer of the synchronous flyback converter circuit, the temporal mean of the current flowing through the secondary winding or of the current provided on the output side via the transformer of the synchronous flyback converter circuit must therefore be set correspondingly small.

For this purpose, the control unit may be designed to control the on duration of the second switch in such a way that the polarity of the current flowing through the secondary winding and second switch changes from a positive polarity to a negative polarity and consequently the voltage at the secondary winding reverses, i.e., for example, from a positive polarity to a negative polarity or with respect to another reference voltage, such as a bus voltage. This means that the control unit is preferably designed to operate the second switch in the conductive state until the direction of the current flowing through the secondary winding reverses. When the first switch is subsequently switched on, the switch current flowing through the first switch then has a negative component and a positive component.

Operation of the synchronous flyback converter circuit, in particular of the first switch and second switch, by the control unit, in which, during the alternating, in particular alternating and periodic, control of the first switch and second switch, the on duration of the second switch is selected such that the polarity of the current flowing through the secondary winding and second switch changes from a positive polarity to a negative polarity, can also be referred to as a synchronous operation type or a synchronous operating mode.

In that the current flowing through the secondary winding has a negative polarity at least temporarily, a particularly small temporal mean of the current flowing through the secondary winding can be achieved. As a result, the synchronous flyback converter circuit according to the invention can output a small current for the illuminant line on the output side, and accordingly correspondingly low brightnesses of the light radiated by the illuminant line can be achieved for corresponding dimming signals for the illuminant line.

The first switch and the second switch are preferably a circuit breaker, a field-effect transistor, such as a metal-oxide semiconductor field-effect transistor (MOSFET), or a bipolar transistor. Other types of switches, particularly transistor types, may also be used for the first and second switches. The first and second switches are preferably of the same switch type, in particular transistor type, for example both are FET (MOSFET) or bipolar transistors.

The control unit is preferably designed to control or clock the first switch and second switch at a high frequency, particularly at a frequency which is greater than or equal to 80 kHz, particularly greater than or equal to 100 kHz, very particularly greater than or equal to 150 kHz.

By the alternating, in particular alternating and periodic, clocking of the first switch and second switch, i.e., by alternating, in particular alternating and periodic, switching on and off of the first and second switches, and the charging and discharging of the transformer caused thereby, the control unit is preferably designed, from an electrical energy source that can be connected to the input of the synchronous flyback converter circuit, to set an electrical energy, current and/or voltage provided at the output of the synchronous flyback converter circuit.

The control unit is preferably designed to control the first switch and second switch alternately, in particular alternately and periodically, on the basis of the separately determined temporal mean of the positive component of the switch current and the temporal mean of the negative component of the switch current. In particular, the control unit is preferably designed to control the first switch and second switch alternately, in particular alternately and periodically, on the basis of the combination of the temporal mean of the positive component of the switch current and the temporal mean of the negative component of the switch current.

The control unit can be an integrated semiconductor circuit or comprise an integrated semiconductor circuit. The control unit is preferably an FPGA, processor, a microprocessor, a controller, a microcontroller or an application-specific integrated circuit (ASIC) or a combination of these elements.

The synchronous flyback converter circuit can be connected on the input side to an electrical energy source which then provides the synchronous flyback converter circuit on the input side with a DC voltage or a rectified AC voltage, which has preferably been smoothed or filtered.

The illuminant line preferably comprises one or more illuminants. The illuminants are preferably electrically connected to each other in series and/or in parallel if more than one illuminant is arranged in the illuminant line.

Any illuminant that is known to the person skilled in the art and the light emission of which can be controlled by the electrical energy fed to the illuminant can be used as the illuminant. The at least one illuminant of the illuminant line preferably corresponds to a light-emitting diode (LED). The illuminant line can comprise any type of light-emitting diode, such as an organic light-emitting diode, an inorganic light-emitting diode, a light-emitting diode with secondary excitation, etc. The illuminant line preferably comprises different types of illuminants or just one type of illuminant. The present invention is not limited to any particular illuminant.

The control unit is preferably designed to separately determine the temporal mean of the positive component of the switch current and the temporal mean of the negative component of the switch current on the basis of the signal fed from the detection circuit and of the time of the zero crossing of the switch current.

In particular, the control unit is designed to determine, in particular evaluate, once the first switch has been switched on or switched to conductive, the time curve of the supplied signal up to the time of the zero crossing of the switch current as the temporal mean of the negative component of the switch current and the time curve of the supplied signal from the time of the zero crossing of the switch current as the temporal mean of the positive component of the switch current.

The control unit can also process in an analog or digital manner the signal fed by the detection circuit.

The detection circuit preferably has a capacitor which is electrically connected to the first switch such that it is charged by the switch current flowing through the first switch, and the signal is a voltage output by the capacitor.

In other words, the detection circuit preferably comprises a capacitor for forming the temporal mean of the switch current flowing through the first switch.

The capacitor is preferably a component of a low-pass filter.

In addition, a factor which represents or compensates for the deviations of the signal arising during signal generation from the mean current actually flowing through the primary winding and the first switch can be calculated or determined experimentally. The control unit may be designed to determine the current from the voltage output by the capacitor by means of this specified factor indicating the relation between the current flowing through the first switch and the voltage output by the capacitor.

The control unit is preferably designed to switch on the first switch and second switch alternately such that, during the on duration of the second switch, the polarity of the current flowing through the second switch changes from a positive polarity to a negative polarity so that during the subsequent on duration of the first switch, the switch current flowing through the first switch has a negative component and a positive component.

This means that, in the alternating control of the first switch and second switch by the control unit, the on duration of the second switch can be selected such that, during the on duration of the second switch, the polarity of the current flowing through the second switch changes from a positive polarity to a negative polarity so that during the subsequent on duration of the first switch, the switch current flowing through the first switch has a negative component and a positive component.

In particular, the control unit is designed to switch on the first switch and second switch alternately and periodically such that, during the on duration of the second switch, the polarity of the current flowing through the second switch changes from a positive polarity to a negative polarity so that during the subsequent on duration of the first switch, the switch current flowing through the first switch has a negative component and a positive component.

Furthermore, the control unit is preferably designed to determine the actual temporal mean of the switch current by combining the temporal mean of the positive component of the switch current with the temporal mean of the negative component of the switch current.

The temporal mean of the switch current captured by the detection circuit can differ from the actual temporal mean, in particular at a very low dimming level and consequently very small temporal mean of the switch current, this being due to noise which can occur during capture. This is not the case if the control unit determines the temporal mean of the switch current by combining the temporal mean of the positive component of the switch current with the temporal mean of the negative component of the switch current. Consequently, the temporal mean of the switch current determined by the control unit corresponds to the actual temporal mean of the switch current and is therefore also referred to as such.

The temporal mean of the positive component of the switch current corresponds in particular to the positive average current which flows through the first switch during the on duration of the first switch. The temporal mean of the negative component of the switch current corresponds in particular to the negative average current which flows through the first switch during the on duration of the first switch. The actual temporal mean of the switch current corresponds in particular to the average current which actually flows through the first switch during the on duration of the first switch.

The control unit is preferably designed to control the first switch and second switch alternately, in particular alternately and periodically, on the basis of the determined actual temporal mean of the switch current, in particular on the basis of the combination of the temporal mean of the positive component of the switch current and the temporal mean of the negative component of the switch current.

The control unit is designed in particular to set the time at which the first switch is switched off and/or on, on the basis of the determined actual temporal mean of the switch current, in particular on the basis of the signal fed to the control unit by the detection circuit and the temporal mean of the positive component of the switch current and temporal mean of the negative component of the switch current determined therefrom. When the switch-off time and the switch-on time of the first switch are set, the on duration or the off duration of the first switch is also set.

The switch-off time of the first switch can also be established indirectly by setting an on duration relative to the switch-on time of the first switch.

In the case of an alternating control of the first and second switches, the time at which the second switch is switched on and/or off is then obtained via the time at which the first switch is switched off and/or on.

Alternatively or additionally, the control unit can be designed to set the time at which the second switch is switched off and/or on, on the basis of the determined actual temporal mean of the switch current, in particular on the basis of the signal fed to the control unit by the detection circuit and the temporal mean of the positive component of the switch current and temporal mean of the negative component of the switch current determined therefrom.

In order to regulate the electrical energy provided on the output side by the synchronous flyback converter circuit or the current provided on the output side by the synchronous flyback converter circuit for operation of the illuminant line that can be connected on the output side, the control unit can be designed to set the time at which the first switch is switched off and/or on and/or the time at which the second switch is switched off and/or on, on the basis of a deviation of the determined actual temporal mean of the switch current flowing through the first switch from a specified value.

The control unit is therefore preferably designed to set the time at which the first switch is switched off and/or on and/or the time at which the second switch is switched off and/or on, on the basis of a deviation of the combination of the determined temporal mean of the positive component of the switch current and the determined temporal mean of the negative component of the switch current from a specified value.

Depending on the magnitude of the determined deviation, the time at which the first switch is switched off can be more or less delayed or the time at which the first switch is switched on can be brought forward in order, for example, to correct an excessively low electrical energy provided on the output side or an excessively low current provided.

In order to achieve the first embodiment of the synchronous flyback converter circuit according to the invention, the above optional features can be combined as desired.

According to a second embodiment of the present invention, a synchronous flyback converter circuit is provided for operating an illuminant line with at least one illuminant, in particular with at least one light-emitting diode; the synchronous flyback converter circuit comprising:

a transformer having a primary winding, which is electrically connected to a first switch, and a secondary winding, which is electrically connected to an output of the synchronous flyback converter circuit via a second switch, the illuminant line being connectable at the output, a control unit designed to control the first switch and second switch, and a detection circuit;

wherein the transformer galvanically isolates a primary side of the synchronous flyback converter circuit on which the primary winding, the first switch, the control unit and the detection circuit are arranged from a secondary side of the synchronous flyback converter circuit on which the secondary winding, the second switch and the output are arranged; and wherein the detection circuit is designed to separately capture a temporal mean of the positive component of the switch current flowing through the first switch and a temporal mean of the negative component of the switch current flowing through the first switch; and to feed to the control unit a first signal representing the temporal mean of the negative component of the switch current and a second signal representing the temporal mean of the positive component of the switch current.

In other words, the present invention proposes, in a second embodiment of the synchronous flyback converter circuit according to the invention, that a temporal mean of the positive component of the switch current and a temporal mean of the negative component of the switch current be captured separately and these separately captured temporal means be fed as two separate signals to the control unit.

Consequently, the second embodiment of the synchronous flyback converter circuit according to the invention is advantageous since, due to a separate primary-side capture of the temporal mean of the positive component of the switch current flowing through the first switch and the temporal mean of the negative component of the switch current, information relating to the average current flowing on the secondary side can be collected without an electrically isolated re-transmission from the secondary side to the primary side being necessary.

Furthermore, even at a very low dimming level, the actual temporal mean of the switch current flowing through the first switch can be inexpensively captured by combining the captured temporal mean of the positive component of the switch current and the captured temporal mean of the negative component of the switch current. At a very low dimming level, the temporal mean of the positive component of the switch current and the temporal mean of the negative component of the switch current are in fact much higher than the temporal mean of the entire switch current so that the signal representing the temporal mean of the positive component of the switch current and the signal representing the temporal mean of the negative component of the switch current have a good signal-to-noise ratio (SNR) and consequently are not falsified by noise which may be present in the case of inexpensive capture.

The actual temporal mean of the switch current can therefore be ascertained, in particular determined, on the basis of the separately captured temporal mean of the positive component of the switch current and temporal mean of the negative component of the switch current since these two separately captured temporal means are not falsified by noise which may be present in the case of inexpensive capture.

The control unit is preferably designed to evaluate the first and second signals in order to obtain the temporal mean of the positive component of the switch current and the temporal mean of the negative component of the switch current.

Separate capture of the temporal mean of the positive component and of the temporal mean of the negative component of the switch current flowing through the first switch is understood to mean that the temporal mean of the positive component of or positive contribution to the switch current can be captured independently of the temporal mean of the negative component of or negative contribution to the switch current, and that correspondingly the temporal mean of the negative component of the switch current can be captured independently of the temporal mean of the positive component of the switch current.

The switch current flowing through the first switch is understood to mean the current which flows through the first switch when it is in the conductive state or is switched on. Since the first switch is electrically connected to the primary winding, the current flowing through the primary winding in the conductive state of the first switch corresponds to the switch current.

The positive component of the switch current preferably corresponds to a positive current which flows through the first switch in the conductive state; and the negative component of the switch current preferably corresponds to a negative current which flows through the first switch in the conductive state.

With regard to the positive component, the negative component of the switch current corresponds in particular to a current return flow through the first switch.

The positive component of the switch current preferably corresponds to a current which flows from the higher-potential input terminal of the synchronous flyback converter circuit through the primary winding of the transformer and the first switch in the conductive state to the lower-potential input terminal. The negative component of the switch current preferably corresponds to a current which flows from the lower-potential input terminal of the synchronous flyback converter circuit through the first switch in the conductive state and the primary winding of the transformer to the higher-potential input terminal.

As already explained above, the transformer separates or decouples a primary side of the synchronous flyback converter circuit from a secondary side of the synchronous flyback converter circuit so that there is galvanic isolation between the input and the output of the synchronous flyback converter circuit. The synchronous flyback converter circuit is thus designed to transmit in an electrically isolated manner electrical energy between its primary side (can also be referred to as the input side) and its secondary side (can also be referred to as the output side) by means of the transformer.

As already explained above, a "synchronous flyback converter circuit" is understood in particular to mean a "normal" flyback converter circuit in which the at least one secondary-side diode used for rectification is replaced by at least one controllable secondary-side switch.

The control unit is preferably designed to control or clock the first switch and the second switch alternately. In other words, when the first switch is switched to conductive, the second switch is preferably switched to non-conductive; and when the first switch is switched to non-conductive, the second switch is preferably switched to conductive.

In order to generate an output-side current for the operation of the illuminant line, the control unit of the synchronous flyback converter circuit according to the invention is therefore preferably designed to operate the first switch and second switch alternately in the conductive state. In particular, the control unit is designed to operate the first switch and second switch alternately and periodically in the conductive state.

In order to reach a dimming level specified by a dimming signal, the control unit is preferably designed to operate the first and second switches alternately in the conductive state in accordance with the dimming signal. In order to reach a dimming level specified by a dimming signal, the control unit is in particular designed to operate the first and second switches alternately and periodically in the conductive state in accordance with the dimming signal.

If, during the on duration of the first switch, the first switch is in the conductive state or is conducting and the second switch is in the non-conductive state or is not conducting, then on the primary side of the synchronous flyback converter circuit, a current flows through the primary winding of the transformer and the conductive first switch, which is supplied by a supply voltage fed to the input, and electrical energy is stored in the primary winding. If the first switch is switched to non-conductive and the second switch is switched to conductive, then the electrical energy stored in the primary winding is transmitted to the secondary winding of the transformer. Consequently, during the on duration of the second switch (first switch non-conductive and second switch conductive), a current flows on the secondary side from the secondary winding via the conductive second switch to the illuminant line connected to the output. This current then consequently corresponds to the current provided on the output side by the synchronous flyback converter circuit for the operation of the illuminant line.

In order to dim the illuminant line, the temporal mean of the current which is provided by the synchronous flyback converter circuit on the output side to the illuminant line must be reduced. The lower or smaller the dimming level, the lower or less is the brightness of the light emitted by the illuminant line.

In order to achieve very low dimming levels, i.e., very low brightnesses, a correspondingly very small temporal mean of the current provided on the output side to the illuminant line must be achieved. Since the current provided on the output side to the illuminant line corresponds to the current flowing through the secondary winding of the transformer of the synchronous flyback converter circuit, the temporal mean of the current flowing through the secondary winding or of the current provided on the output side via the transformer of the synchronous flyback converter circuit must therefore be set correspondingly small.

For this purpose, the control unit may be designed to control the on duration of the second switch in such a way that the polarity of the current flowing through the secondary winding and second switch changes from a positive polarity to a negative polarity and consequently the voltage at the secondary winding reverses, i.e., for example, from a positive polarity to a negative polarity or with respect to another reference voltage, such as a bus voltage. This means that the control unit is preferably designed to operate the second switch in the conductive state until the direction of the current flowing through the secondary winding reverses. When the first switch is subsequently switched on, the switch current flowing through the first switch then has a negative component and a positive component.

Operation of the synchronous flyback converter circuit, in particular of the first switch and second switch, by the control unit, in which, during the alternating, in particular alternating and periodic, control of the first switch and second switch, the on duration of the second switch is selected such that the polarity of the current flowing through the secondary winding and second switch changes from a positive polarity to a negative polarity, can also be referred to as a synchronous operation type or a synchronous operating mode.

In that the current flowing through the secondary winding has a negative polarity at least temporarily, a particularly small temporal mean of the current flowing through the secondary winding can be achieved. As a result, the synchronous flyback converter circuit according to the invention can output a small current for the illuminant line on the output side, and accordingly correspondingly low brightnesses of the light radiated by the illuminant line can be achieved for corresponding dimming signals for the illuminant line.

The first switch and the second switch are preferably a circuit breaker, a field-effect transistor, such as a metal-oxide semiconductor field-effect transistor (MOSFET), or a bipolar transistor. Other types of switches, particularly transistor types, may also be used for the first and second switches. The first and second switches are preferably of the same switch type, in particular transistor type.

The control unit is preferably designed to control or clock the first switch and second switch at a high frequency, in particular at a frequency which is greater than or equal to 80 kHz, particularly greater than or equal to 100 kHz, very particularly greater than or equal to 150 kHz.

By the alternating, in particular alternating and periodic, clocking of the first switch and second switch, i.e., by alternating, in particular alternating and periodic, switching on and off of the first and second switches, and the charging and discharging of the transformer caused thereby, the control unit is preferably designed, from an electrical energy source that can be connected to the input of the synchronous flyback converter circuit, to set an electrical energy, current and/or voltage provided at the output of the synchronous flyback converter circuit.

The control unit is preferably designed to control the first switch and second switch alternately, in particular alternately and periodically, on the basis of the separately captured temporal mean of the positive component of the switch current and temporal mean of the negative component of the switch current. In particular, the control unit is preferably designed to control the first switch and second switch alternately, in particular alternately and periodically, on the basis of the combination of the temporal mean of the positive component of the switch current and the temporal mean of the negative component of the switch current.

The control unit can be an integrated semiconductor circuit or comprise an integrated semiconductor circuit. The control unit is preferably an FPGA, processor, a microprocessor, a controller, a microcontroller or an application-specific integrated circuit (ASIC) or a combination of these elements.

The synchronous flyback converter circuit can be connected on the input side to an electrical energy source which then provides the synchronous flyback converter circuit on the input side with a DC voltage or a rectified AC voltage, which has preferably been smoothed or filtered.

The illuminant line preferably comprises one or more illuminants. The illuminants are preferably electrically connected to each other in series and/or in parallel if more than one illuminant is arranged in the illuminant line.

Any illuminant that is known to the person skilled in the art and the light emission of which can be controlled by the electrical energy fed to the illuminant can be used as the illuminant. The at least one illuminant of the illuminant line preferably corresponds to a light-emitting diode (LED). The illuminant line can comprise any type of light-emitting diode, such as an organic light-emitting diode, an inorganic light-emitting diode, a light-emitting diode with secondary excitation, etc. The illuminant line preferably comprises different types of illuminants or just one type of illuminant. The present invention is not limited to any particular illuminant.

The detection circuit preferably has two detection branches; wherein a first detection branch of the two detection branches is designed to capture the temporal mean of the negative component of the switch current and to feed the first signal representing this temporal mean to the control unit; and a second detection branch of the two detection branches is designed to capture the temporal mean of the positive component of the switch current and to feed the second signal representing this temporal mean to the control unit.

The control unit can process in an analog or digital manner the first signal fed by the first detection branch and the second signal fed by the second detection branch.

In particular in the case of digital processing of the first and second signals fed by the detection circuit, an inexpensive analog-digital converter can be used in the control unit since the noise occurring in such an analog-digital converter even at low dimming levels and consequently small temporal means of the switch current is low compared to the temporal mean of the positive component of the switch current and the temporal mean of the negative component of the switch current and therefore does not falsify these two captured temporal means.

Furthermore, the first detection branch preferably has a first diode, the cathode of which is electrically connected to the first switch such that only the negative component of the switch current flowing through the first switch can flow through the first detection branch; and the second detection branch preferably has a second diode, the anode of which is electrically connected to the switch such that only the positive component of the switch current flowing through the first switch can flow through the second detection branch.

Furthermore, the first detection branch preferably has a first capacitor which is electrically connected to the anode of the first diode such that it is charged by the negative component of the switch current flowing through the first switch; and the second detection branch preferably has a second capacitor which is electrically connected to the cathode of the second diode such that it is charged by the positive component of the switch current flowing through the first switch; wherein the first signal is a voltage output by the first capacitor and the second signal is a voltage output by the second capacitor.

In other words, the first detection branch preferably comprises a first capacitor for forming the temporal mean of the negative component of the current flowing through the first switch, and the second detection branch preferably comprises a second capacitor for forming the temporal mean of the positive component of the current flowing through the first switch.

In addition, a first factor, which represents or compensates for the deviations of the first signal arising during signal generation from the mean negative component of the current actually flowing through the primary winding and the first switch, and also a second factor, which represents or compensates for the deviations of the second signal arising during signal generation from the mean positive component of the current actually flowing through the primary winding and the first switch, can be calculated or determined experimentally. In this case, the first factor and the second factor preferably do not differ.

The control unit may be designed to determine the negative component of the current from the voltage output by the first capacitor by means of this specified first factor indicating the relation between the negative component of the current flowing through the first switch and the voltage output by the first capacitor. The control unit may furthermore be designed to determine the positive component of the current from the voltage output by the second capacitor by means of this specified second factor indicating the relation between the positive component of the current flowing through the first switch and the voltage output by the second capacitor.

The first capacitor is preferably a component of a first low-pass filter and the second capacitor is preferably a component of a second low-pass filter.

The first diode and the second diode are preferably arranged in the same housing.

That is to say, the first diode of the first detection branch and the second diode of the second detection branch are preferably housed in the same housing or package.

This is advantageous since the first diode and the second diode then exhibit the same temperature dependence, and consequently the separate capture of the negative and positive components of the switch current flowing through the first switch by the first detection branch and second detection branch is not disturbed, in particular falsified, by a different temperature dependence of the first diode and second diode.

The control unit is preferably designed to switch on the first switch and second switch alternately such that, during the on duration of the second switch, the polarity of the current flowing through the second switch changes from a positive polarity to a negative polarity so that during the subsequent on duration of the first switch, the switch current flowing through the first switch has a negative component and a positive component.

This means that, in the alternating control of the first switch and second switch by the control unit, the on duration of the second switch can be selected such that, during the on duration of the second switch, the polarity of the current flowing through the second switch changes from a positive polarity to a negative polarity so that during the subsequent on duration of the first switch, the switch current flowing through the first switch has a negative component and a positive component.

In particular, the control unit is designed to switch on the first switch and second switch alternately and periodically such that, during the on duration of the second switch, the polarity of the current flowing through the second switch changes from a positive polarity to a negative polarity so that during the subsequent on duration of the first switch, the switch current flowing through the first switch has a negative component and a positive component.

Furthermore, the control unit is preferably designed to determine the actual temporal mean of the switch current by combining the temporal mean of the positive component of the switch current with the temporal mean of the negative component of the switch current.

As already stated above, noise that can occur during capture does not falsify the separately captured temporal mean of the positive component of the switch current and temporal mean of the negative component of the switch current. Consequently, the temporal mean of the switch current determined by the control unit, which is determined by combining the captured temporal mean of the positive component of the switch current with the captured temporal mean of the negative component of the switch current, corresponds to the actual temporal mean of the switch current and is therefore also referred to as such.

The temporal mean of the positive component of the switch current corresponds in particular to the positive average current which flows through the first switch during the on duration of the first switch. The temporal mean of the negative component of the switch current corresponds in particular to the negative average current which flows through the first switch during the on duration of the first switch. The actual temporal mean of the switch current corresponds in particular to the average current which actually flows through the first switch during the on duration of the first switch.

The control unit is preferably designed to control the first switch and second switch alternately, in particular alternately and periodically, on the basis of the determined actual temporal mean of the switch current, in particular on the basis of the combination of the captured temporal mean of the positive component of the switch current and the captured temporal mean of the negative component of the switch current.

The control unit is designed, in particular, to set the time at which the first switch is switched off and/or on, on the basis of the determined actual temporal mean of the switch current, in particular on the basis of the captured temporal mean of the positive component of the switch current and the temporal mean of the negative component of the switch current. When the switch-off time and the switch-on time of the first switch are set, the on duration or the off duration of the first switch is also set.

The switch-off time of the first switch can also be established indirectly by setting an on duration relative to the switch-on time of the first switch.

In the case of an alternating control of the first and second switches, the time at which the second switch is switched on and/or off is then obtained via the time at which the first switch is switched off and/or on.

Alternatively or additionally, the control unit can be designed to set the time at which the second switch is switched off and/or on, on the basis of the determined actual temporal mean of the switch current, in particular on the basis of the captured temporal mean of the positive component of the switch current and the temporal mean of the negative component of the switch current.

In order to regulate the electrical energy provided on the output side by the synchronous flyback converter circuit or the current provided on the output side by the synchronous flyback converter circuit for operation of the illuminant line that can be connected on the output side, the control unit can be designed to set the time at which the first switch is switched off and/or on and/or the time at which the second switch is switched off and/or on, on the basis of a deviation of the determined actual temporal mean of the switch current flowing through the first switch from a specified value.

The control unit is therefore preferably designed to set the time at which the first switch is switched off and/or on and/or the time at which the second switch is switched off and/or on, on the basis of a deviation of the combination of the captured temporal mean of the positive component of the switch current and the captured temporal mean of the negative component of the switch current from a specified value.

Depending on the magnitude of the determined deviation, the time at which the first switch is switched off can be more or less delayed or the time at which the first switch is switched on can be brought forward in order, for example, to correct an excessively low electrical energy provided on the output side or an excessively low current provided.

In order to achieve the second embodiment of the synchronous flyback converter circuit according to the invention, the above optional features can be combined as desired.

According to the present invention, a luminaire with a synchronous flyback converter circuit according to the invention according to the above embodiments and an illuminant line with at least one illuminant, in particular with at least one light-emitting diode, is also provided; wherein the synchronous flyback converter circuit is designed, from an input voltage supplied on the input side, to provide an output voltage for operating the illuminant line on the output side.

In other words, a luminaire according to the invention is also provided which has, in addition to an illuminant line with at least one illuminant, in particular with at least one light-emitting diode, a synchronous flyback converter circuit according to the invention according to the first embodiment described above or a synchronous flyback converter circuit according to the invention according to the second embodiment described above.

The illuminant line is in particular connected on the output side to the synchronous flyback converter circuit according to the invention.

The illuminant line preferably comprises one or more illuminants. The illuminants are preferably electrically connected to each other in series and/or in parallel if more than one illuminant is arranged in the illuminant line.

Any illuminant that is known to the person skilled in the art and the light emission of which can be controlled by the electrical energy fed to the illuminant can be used as the illuminant. The at least one illuminant of the illuminant line preferably corresponds to a light-emitting diode (LED). The illuminant line can comprise any type of light-emitting diode, such as an organic light-emitting diode, an inorganic light-emitting diode, a light-emitting diode with secondary excitation, etc. The illuminant line preferably comprises different types of illuminants or just one type of illuminant. The present invention is not limited to any particular illuminant.

According to the present invention, a method is furthermore provided for operating a synchronous flyback converter circuit according to the invention according to the first embodiment described above; the method comprising the following step: separately determining, with the control unit, a temporal mean of the positive component of the switch current flowing through the first switch and a temporal mean of the negative component of the switch current flowing through the first switch on the basis of the signal fed from the detection circuit.

The present invention furthermore provides a method for operating a synchronous flyback converter circuit according to the invention according to the second embodiment described above; the method comprising the following steps: separately capturing, with the detection circuit, a temporal mean of the positive component of the switch current flowing through the first switch and a temporal mean of the negative component of the switch current flowing through the first switch; and feeding to the control unit, with the detection circuit, a first signal representing the temporal mean of the negative component of the switch current and a second signal representing the temporal mean of the positive component of the switch current.

BRIEF DESCRIPTION OF THE DRAWINGS

A detailed description of the figures is given below. These show.

DETAILED DESCRIPTION

In the figures, corresponding or similar elements are identified by identical reference symbols.

Figure 1:
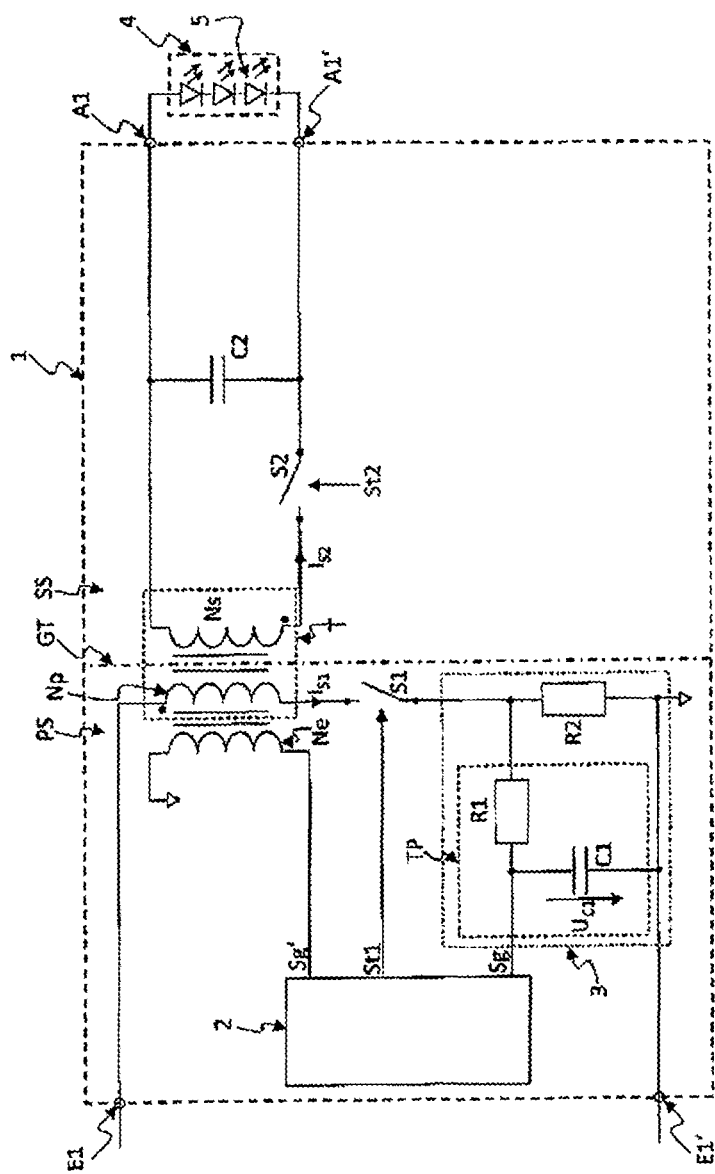
FIG. 1 by way of example, a schematic circuit diagram of the first embodiment of the synchronous flyback converter circuit according to the invention.

FIG. 1 shows by way of example a schematic circuit diagram of the first embodiment of the synchronous flyback converter circuit according to the invention.

The synchronous flyback converter circuit 1 in FIG. 1 comprises a transformer T which provides a galvanic isolation GT between a primary side PS or input side and a secondary side SS or output side of the synchronous flyback converter circuit 1. Consequently, the synchronous flyback converter circuit 1 has a galvanic isolation GT, provided by the transformer T, between its input E1, E1' and its output A1, A1'.

An electrical energy source or electrical energy supply (not shown in FIG. 1) can be connected to the input, in particular to the at least two input terminals E1 and E1', which energy source or energy supply in the connected state can provide the synchronous flyback converter circuit 1 on the input side with a DC voltage or a rectified AC voltage, which has preferably also been smoothed or filtered.

At the output, in particular at the at least two output A1 and A1', an illuminant line 4 having at least one illuminant 5 can be connected. As shown in FIG. 1, the illuminant line 4 comprises three illuminants 5, but according to the invention, the illuminant line 4 can also have one only, two or more than three illuminants 5.

As already stated above, the illuminants 5 can be electrically connected to each other in series and/or in parallel if more than one illuminant is arranged in the illuminant line. Any illuminant that is known to the person skilled in the art and the light emission of which can be controlled by the electrical energy fed to the illuminant can be used as the illuminant 5. The illuminants 5 of the illuminant line 4 preferably correspond to a light-emitting diode (LED). The illuminant line 4 can comprise any type of light-emitting diode, such as an organic light-emitting diode, an inorganic light-emitting diode, a light-emitting diode with secondary excitation, etc. The illuminant line 4 preferably comprises different types of illuminants or just one type of illuminant.

The synchronous flyback converter circuit 1 and the illuminant line 4 together form a luminaire according to the invention.

The input, in particular the input terminals E1 and E1'; the primary winding Np of the transformer T; a detection winding Ne; a first switch S1; a detection circuit 3; and a control unit 2 are arranged on the primary side PS of the synchronous flyback converter circuit 1 shown in FIG. 1.

The first switch S1 is electrically connected in series with the primary winding Np of the transformer T.

Consequently, in the conductive state of the first switch S1, the switch current $I_{S1}$ flows through the primary winding Np and the first switch S1, wherein the primary winding Np is charged by the switch current $I_{S1}$.

The output, in particular the output terminals A1 and A1'; the secondary winding Ns of the transformer T; a second switch S2 and an optional capacitor C2 are arranged on the secondary side SS of the synchronous flyback converter circuit 1 shown in FIG. 1.

The secondary winding Ns of the transformer T is electrically connected via the second switch S2 to the optional capacitor C2 and to the output of the synchronous flyback converter circuit.

The secondary winding Ns of the transformer T and the second switch S2 are electrically connected in series between the first output terminal A1 and the second output terminal A1'.

The optional capacitor C2 is in particular a smoothing capacitor or a filtering capacitor. The optional capacitor C2 thus preferably serves for smoothing or filtering.

The primary winding Np and the secondary winding Ns of the transformer T preferably have a different polarity/winding direction.

As shown in FIG. 1, the second switch S2 is connected between a second terminal of the secondary winding Ns and the second output terminal A1'. Alternatively, however, the second switch S2 can also be connected between the first terminal of the secondary winding Ns and the first output terminal A1 (not shown in FIG. 1). The polarity/winding direction of the primary winding Np and of the secondary winding Ns of the transformer T and optionally the terminal of the illuminant line 4 to the output A1, A1' can then preferably be adapted accordingly.

On the primary side PS of the synchronous flyback converter circuit 1, the first switch S1 and the primary winding Np of the transformer T are designed such that, in the conductive state of the first switch S1, from an electrical energy source which can be connected to the input E1, E1', a current $I_{S1}$ (switch current) flows through the primary winding Np of the transformer T and the first switch S1, thereby charging the primary winding Np of the transformer T with electrical energy. The electrical energy is then transmitted in an electrically isolated manner from the primary winding Np to the secondary winding Ns, that is from the primary side PS to the secondary side SS, when the first switch S1 is switched off. In the non-conductive state of the first switch S1, the secondary winding Ns is then discharged, in particular demagnetized.

In this case, the second switch S2 is preferably clocked complementarily or alternately with respect to the first switch S1. In other words, when the first switch S1 is switched to conductive, the second switch S2 is switched to non-conductive; and when the first switch S1 is switched to non-conductive, the second switch S2 is switched to conductive.

The first switch S1 and the second switch S2 are preferably a circuit breaker, a field-effect transistor, such as a metal-oxide semiconductor field-effect transistor (MOSFET), or a bipolar transistor.

The control unit 2 is designed to set the electrical energy, current and/or voltage provided at the output A1, A1' of the synchronous flyback converter circuit 1 and thus to control the operation of the illuminant line 4 connected to the output.

The primary-side control unit 2 is designed to control the first switch S1 and the second switch S2 (this is indicated in FIG. 1 by corresponding arrows). For this purpose, the primary-side control unit 2 is designed to generate corresponding control signals St1 and St2 and to feed these to the first switch S1 and the second switch S2 (the first switch S1 is fed with the control signal St1 and the second switch S2 is fed with the control signal St2). The second switch S2 is preferably controlled by the primary-side control unit 2 in this case in a galvanically isolated or electrically isolated manner (not shown).

The primary-side control unit 2 of the first embodiment of the synchronous flyback converter circuit according to the invention shown in FIG. 1 is in particular designed to control the first switch S1 and the second switch S2 according to the above descriptions of the first embodiment of the synchronous flyback converter circuit according to the invention.

Consequently, the control unit 2 is designed to operate the synchronous flyback converter circuit 1, in particular the first switch S1 and the second switch S2, in the synchronous operating mode described above.

In this case, the control unit 2 is preferably designed to operate the first switch S1 and second switch S2 alternately in the conductive state. In particular, the control unit 2 is designed to operate the first switch S1 and second switch S2 alternately and periodically in the conductive state. In this respect, reference is made to FIG. 3 which gives an example of the time curve of the control signal St1 for controlling the first switch S1 and the time curve of the control signal St2 for controlling the second switch S2 during operation of the synchronous flyback converter circuit 1 in the synchronous operating mode.

The primary-side detection circuit 3 comprises a measuring unit R2 in the form of a low-impedance measuring resistor or shunt resistor for measuring the switch current $I_{S1}$ flowing through the first switch S1, and a low-pass filter TP for integrating the switch current $I_{S1}$ measured via the measuring unit R2. Consequently, the detection circuit 3 is designed to capture a temporal mean of the switch current $I_{S1}$ flowing through the first switch S1 and to feed to the control unit 2 a signal Sg representing this temporal mean.

A low-impedance measuring resistor or shunt resistor can also be referred to as a current-measuring resistor.

The measuring unit R2 is electrically connected in series with the first switch S1 in such a way that the voltage falling at the measuring unit R2 is proportional to the switch current $I_{S1}$ flowing through the first switch S1. The primary winding Np of the transformer T, the first switch S1 and the measuring unit R2 are connected in series between the first input terminal E1 and the second input terminal E1'.

The low-pass filter TP is electrically connected to the measuring unit R2 in such a way that the voltage falling at the measuring unit R2, which is a measure of the switch current $I_{S1}$ flowing through the first switch S1 or represents this switch current $I_{S1}$, is fed to the low-pass filter TP and consequently filtered by the latter.

The low-pass filter TP comprises a capacitor C1 and an ohmic resistor R1, wherein the resistor R1 is connected to the measuring resistor R2 and the capacitor C1 is connected to ground. The capacitor C1 is charged via the resistor R1 by the switch current $I_{S1}$ flowing through the first switch S1. The signal Sg representing the temporal mean of the switch current $I_{S1}$ is a voltage $U_{C1}$ output by the capacitor C1.

The control unit 2 can be an integrated semiconductor circuit or comprise an integrated semiconductor circuit. The control unit 2 is preferably an FPGA, a processor, a microprocessor, a controller, a microcontroller or an application-specific integrated circuit (ASIC) or a combination of these elements.

A signal Sg is fed to the control unit 2 by the detection circuit 3, said signal Sg representing the temporal mean of the switch current $I_{S1}$ flowing through the first switch S1.

The control unit 2 is then designed to separately ascertain, in particular to determine, the temporal mean of the positive component of the switch current $I_{S1}$ and the temporal mean of the negative component of the switch current $I_{S1}$ on the basis of the determined time of the zero crossing of the switch current $I_{S1}$ and the signal Sg fed by the detection circuit 3.

The control unit 2 can also process in an analog or digital manner the signal Sg fed by the detection circuit 3.

In particular, the control unit 2 is designed to determine, in particular evaluate, once the first switch S1 has been switched on or switched to conductive, the time curve of the signal Sg fed by the detection circuit 3 up to the time of the zero crossing of the switch current $I_{S1}$ as the temporal mean of the negative component of the switch current $I_{S1}$ and the time curve of the signal Sg fed by the detection circuit 3 from the time of the zero crossing of the switch current $I_{S1}$ as the temporal mean of the positive component of the switch current $I_{S1}$.

The control unit 2 is then designed to ascertain, in particular determine, the actual temporal mean of the switch current $I_{S1}$ flowing through the first switch S1 by combining the temporal mean of the positive component of the switch current $I_{S1}$ and the temporal mean of the negative component of the switch current $I_{S1}$.

By an alternating, in particular an alternating and periodic, clocking of the first switch S1 and second switch S2, i.e., by alternating, in particular alternating and periodic, switching on and off of the first switch S1 and second switch S2, and the charging and discharging of the transformer T caused thereby, from an electrical energy source that can be connected to the input E1, E1' of the synchronous flyback converter circuit 1, the control unit 2 is designed to set an electrical energy, current and/or voltage provided at the output A1, A1' of the synchronous flyback converter circuit.

The control unit 2 is also designed to control the first switch S1 and the second switch S2 alternately, in particular alternately and periodically, on the basis of the determined actual temporal mean of the switch current $I_{S1}$.

The control unit 2 is thus designed to control the first switch S1 and the second switch S2 alternately, in particular alternately and periodically, on the basis of the supplied signals Sg and Sg'.

The control unit 2 can be designed to set the time at which the first switch S1 is switched off and/or on, on the basis of the signals Sg and Sg' fed to the control unit 2.

In particular, the control unit 2 can be designed to set the time at which the first switch S1 is switched off and/or on, on the basis of the actual temporal mean of the switch current $I_{S1}$ determined on the basis of the supplied signals Sg and Sg'.

The switch-off time of the first switch S1 can also be established indirectly by setting an on duration relative to the switch-on time of the first switch S1.

In the case of an alternating control of the first and second switches, the time at which the second switch S2 is switched on and/or off is then obtained via the time at which the first switch S1 is switched off and/or on.

Alternatively or additionally, the control unit 2 can be designed to set the time at which the second switch S2 is switched off and/or on, on the basis of the signals Sg and Sg' fed to the control unit 2.

In particular, the control unit 2 may alternatively or additionally be designed to set the time at which the second switch S2 is switched off and/or on, on the basis of the actual temporal mean of the switch current $I_{S1}$ determined on the basis of the supplied signals Sg and Sg'.

In order to regulate the electrical energy provided on the output side by the synchronous flyback converter circuit 1 or the current $I_{S2}$ provided on the output side by the synchronous flyback converter circuit 1 for operation of the illuminant line 4 connected on the output side, the control unit 2 can be designed to set the time at which the first switch S1 is switched off and/or on and/or the time at which the second switch S2 is switched off and/or on, on the basis of a deviation of the determined actual temporal mean of the switch current $I_{S1}$ flowing through the first switch S1 from a specified value.

The control unit 2 can thus be designed to set the time at which the first switch S1 is switched off and/or on and/or the time at which the second switch S2 is switched off and/or on, on the basis of a deviation of the combination of the determined temporal mean of the positive component of the switch current $I_{S1}$ flowing through the first switch S1 and the determined temporal mean of the negative component of the switch current $I_{S1}$ from a specified value.

Depending on the magnitude of the determined deviation, the time at which the first switch S1 is switched off can be more or less delayed or the time at which the first switch S1 is switched on can be brought forward in order, for example, to correct an excessively low electrical energy provided on the output side or an excessively low provided current $I_{S2}$.

Figure 2:
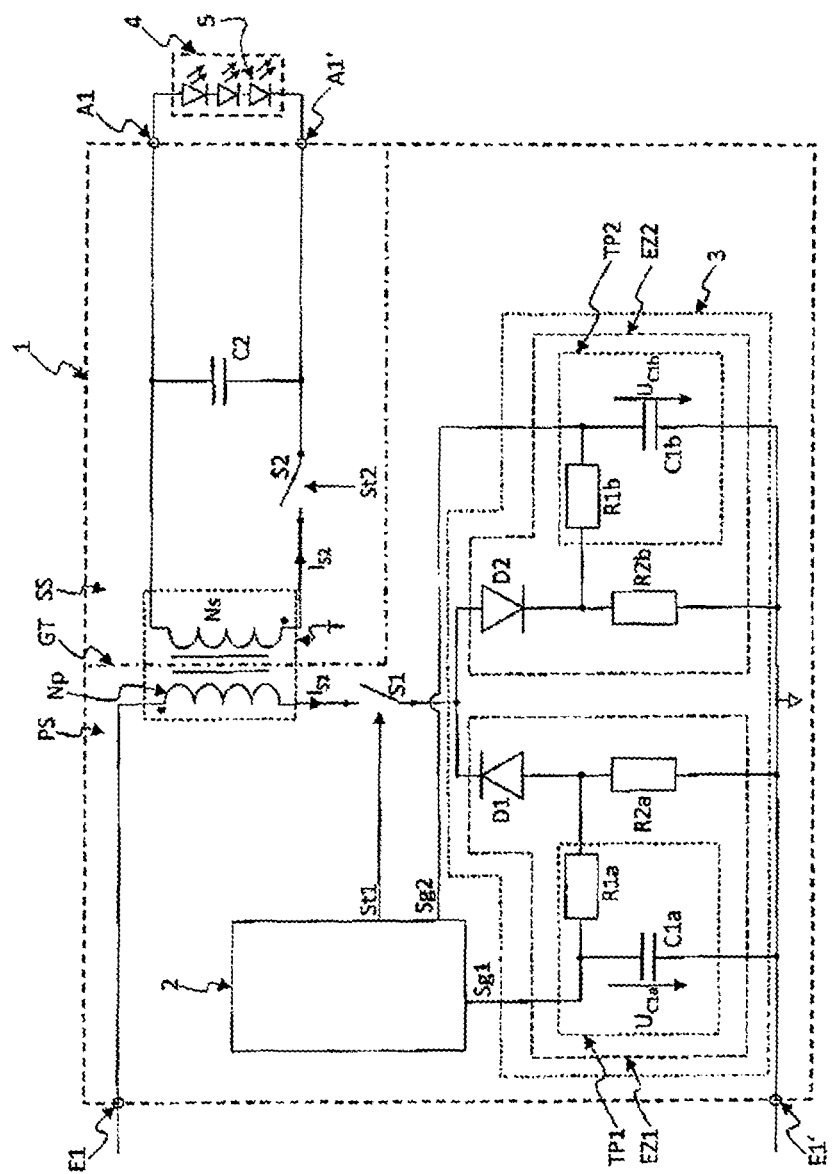
FIG. 2 by way of example, a schematic circuit diagram of the second embodiment of the synchronous flyback converter circuit according to the invention.

FIG. 2 shows by way of example a schematic circuit diagram of the second embodiment of the synchronous flyback converter circuit according to the invention.

The second embodiment of the synchronous flyback converter circuit according to the invention shown in FIG. 2 differs from the first embodiment of the synchronous flyback converter circuit according to the invention shown in FIG. 1 in particular with regard to the detection circuit 3. The statements above relating to the synchronous flyback converter circuit in FIG. 1 are correspondingly applicable to the synchronous flyback converter circuit in FIG. 2. The differences between the synchronous flyback converter circuit in FIG. 1 and the synchronous flyback converter circuit in FIG. 2 are essentially explained below.

The detection circuit 3 of the synchronous flyback converter circuit 1 in FIG. 2 has two detection branches EZ1 and EZ2 which are each electrically connected to the first switch S1.

The first detection branch EZ1 comprises a first diode D1, a first measuring unit R2a in the form of a first low-impedance measuring resistor, and a first low-pass filter TP1. The second detection branch EZ2 comprises a second diode D2, a second measuring unit R2b in the form of a second low-impedance measuring resistor, and a second low-pass filter TP2.

The first detection branch EZ1 and the second detection branch EZ2 are preferably identical except for the arrangement of the first diode D1 and second diode D2.

The cathode of the first diode D1 is electrically connected to the first switch S1 in such a way that only the negative component of the switch current $I_{S1}$ flowing through the first switch S1 can flow through the first detection branch EZ1. The anode of the second diode D2 is electrically connected to the first switch S1 in such a way that only the positive component of the switch current $I_{S1}$ flowing through the first switch S1 can flow through the second detection branch EZ2.

The cathode of the first diode D1, the terminal of the first switch S1 that is not electrically connected to the primary winding Np, and the anode of the second diode D2 are electrically connected to the same node.

The first detection branch EZ1 of the detection circuit 3 comprises the first measuring unit R2a in the form of a low-impedance measuring resistor or shunt resistor for measuring the negative component of the switch current $I_{S1}$ flowing through the first switch S1, and a first low-pass filter TP1 for integrating the negative component of the switch current $I_{S1}$ measured via the first measuring unit R2a. Consequently, the first detection branch EZ1 of the detection circuit 3 is designed to capture the temporal mean of the negative component of the switch current $I_{S1}$ and to feed the control unit 2 with a first signal Sg1 representing this temporal mean.

The first measuring unit R2a is electrically connected in series with the anode of the first diode D1 in such a way that the voltage falling at the first measuring unit R2a is proportional to the negative component of the switch current $I_{S1}$.

The first low-pass filter TP1 is electrically connected to the first measuring unit R2a in such a way that the voltage falling at the first measuring unit R2a, which is a measure of the negative component of the switch current $I_{S1}$ or represents the negative component of the switch current $I_{S1}$, is fed to the first low-pass filter TP1 and consequently filtered by the latter.

The first low-pass filter TP1 comprises a first capacitor C1a and a first resistor R1a, wherein the first resistor R1a is connected to the first measuring resistor R2a and the first capacitor C1a is connected to ground. The first capacitor C1a is charged via the first resistor R1a by the negative component of the switch current $I_{S1}$ flowing through the first switch S1. The first signal Sg1 representing the temporal mean of the negative component of the switch current $I_{S1}$ is a voltage $U_{C1a}$ output by the first capacitor C1a.

The second detection branch EZ2 of the detection circuit 3 comprises the second measuring unit R2b in the form of a low-impedance measuring resistor or shunt resistor for measuring the positive component of the switch current $I_{S1}$ flowing through the first switch S1, and a second low-pass filter TP2 for integrating the positive component of the switch current $I_{S1}$ measured via the second measuring unit R2b. Consequently, the second detection branch EZ2 of the detection circuit 3 is designed to capture the temporal mean of the positive component of the switch current $I_{S1}$ and to feed the control unit 2 with a second signal Sg2 representing this temporal mean.

The second measuring unit R2b is electrically connected in series with the cathode of the second diode D2 in such a way that the voltage falling at the second measuring unit R2b is proportional to the positive component of the switch current $I_{S1}$.

The second low-pass filter TP2 is electrically connected to the second measuring unit R2b in such a way that the voltage falling at the second measuring unit R2b, which is a measure of the positive component of the switch current $I_{S1}$ or represents the positive component of the switch current $I_{S1}$, is fed to the second low-pass filter TP2 and consequently filtered by the latter.

The second low-pass filter TP2 comprises a second capacitor C1b and a second resistor R1b, wherein the second resistor R1b is connected to the second measuring resistor R2b and the second capacitor C1b is connected to ground. The second capacitor C1b is charged via the second resistor R1b by the positive component of the switch current $I_{S1}$ flowing through the first switch S1. The second signal Sg2 representing the temporal mean of the positive component of the switch current $I_{S1}$ is a voltage $U_{C1b}$ output by the second capacitor C1b.

A first signal Sg1 is fed to the control unit 2 by the first detection branch EZ1 of the detection circuit 3, said signal representing the temporal mean of the negative component of the switch current $I_{S1}$ flowing through the first switch S1. Furthermore, a second signal Sg2 is fed to the control unit 2 by the second detection branch EZ2 of the detection circuit 3, said signal representing the temporal mean of the positive component of the switch current $I_{S1}$ flowing through the first switch S1.

The control unit can evaluate in an analog or digital manner the first signal Sg1 and the second signal Sg2.

The control unit 2 is then designed to ascertain, in particular determine, the actual temporal mean of the switch current $I_{S1}$ flowing through the first switch S1 by combining the temporal mean of the positive component of the switch current $I_{S1}$ and the temporal mean of the negative component of the switch current $I_{S1}$.

The primary-side control unit 2 of the second embodiment of the synchronous flyback converter circuit according to the invention is in particular designed to control the first switch S1 and the second switch S2 according to the above descriptions of the second embodiment of the synchronous flyback converter circuit according to the invention.

Consequently, the control unit 2 is designed to operate the synchronous flyback converter circuit 1, in particular the first switch S1 and the second switch S2, in the synchronous operating mode described above.

In this case, the control unit 2 is preferably designed to operate the first switch S1 and second switch S2 alternately in the conductive state. In particular, the control unit 2 is designed to operate the first switch S1 and second switch S2 alternately and periodically in the conductive state. In this respect, reference is made to FIG. 3 which gives an example of the time curve of the control signal SU for controlling the first switch S1 and the time curve of the control signal St2 for controlling the second switch S2 during operation of the synchronous flyback converter circuit 1 in the synchronous operating mode.

By an alternating, in particular an alternating and periodic, clocking of the first switch S1 and second switch S2, i.e., by alternating, in particular alternating and periodic, switching on and off of the first switch S1 and second switch S2, and the charging and discharging of the transformer T caused thereby, from an electrical energy source that can be connected to the input E1, E1' of the synchronous flyback converter circuit 1, the control unit 2 is designed to set an electrical energy, current and/or voltage provided at the output A1, A1' of the synchronous flyback converter circuit.

The control unit 2 is also designed to control the first switch S1 and the second switch S2 alternately, in particular alternately and periodically, on the basis of the determined actual temporal mean of the switch current Isl.

The control unit 2 is thus designed to control the first switch S1 and the second switch S2 alternately, in particular alternately and periodically, on the basis of the first signal Sg1 and second signal Sg2 fed to the control unit 2.

The control unit 2 can be designed to set the time at which the first switch S1 is switched off and/or on, on the basis of the first signal Sg1 and second signal Sg2 fed to the control unit 2.

In particular, the control unit 2 can be designed to set the time at which the first switch S1 is switched off and/or on, on the basis of the actual temporal mean of the switch current $I_{S1}$ determined on the basis of the supplied first signal Sg1 and second signal Sg2.

The switch-off time of the first switch S1 can also be established indirectly by setting an on duration relative to the switch-on time of the first switch S1.

In the case of an alternating control of the first and second switches, the time at which the second switch S2 is switched on and/or off is then obtained via the time at which the first switch S1 is switched off and/or on.

Alternatively or additionally, the control unit 2 can be designed to set the time at which the second switch S2 is switched off and/or on, on the basis of the first signal Sg1 and second signal Sg2 fed to the control unit 2.

In particular, the control unit 2 may alternatively or additionally be designed to set the time at which the second switch S2 is switched off and/or on, on the basis of the actual temporal mean of the switch current $I_{S1}$ determined on the basis of the supplied first signal Sg1 and second signal Sg2.

In order to regulate the electrical energy provided on the output side by the synchronous flyback converter circuit 1 or the current provided on the output side by the synchronous flyback converter circuit 1 for operation of the illuminant line 4 connected on the output side, the control unit 2 can be designed to set the time at which the first switch S1 is switched off and/or on and/or the time at which the second switch S2 is switched off and/or on, on the basis of a deviation of the determined actual temporal mean of the switch current $I_{S1}$ flowing through the first switch S1 from a specified value.

The control unit 2 can thus be designed to set the time at which the first switch S1 is switched off and/or on and/or the time at which the second switch S2 is switched off and/or on, on the basis of a deviation of the combination of the captured temporal mean of the positive component of the switch current $I_{S1}$ flowing through the first switch S1 and the captured temporal mean of the negative component of the switch current $I_{S1}$ from a specified value.

Depending on the magnitude of the determined deviation, the time at which the first switch S1 is switched off can be more or less delayed or the time at which the first switch S1 is switched on can be brought forward in order, for example, to correct an excessively low electrical energy provided on the output side or an excessively low provided current $I_{S2}$.

Figure 3:
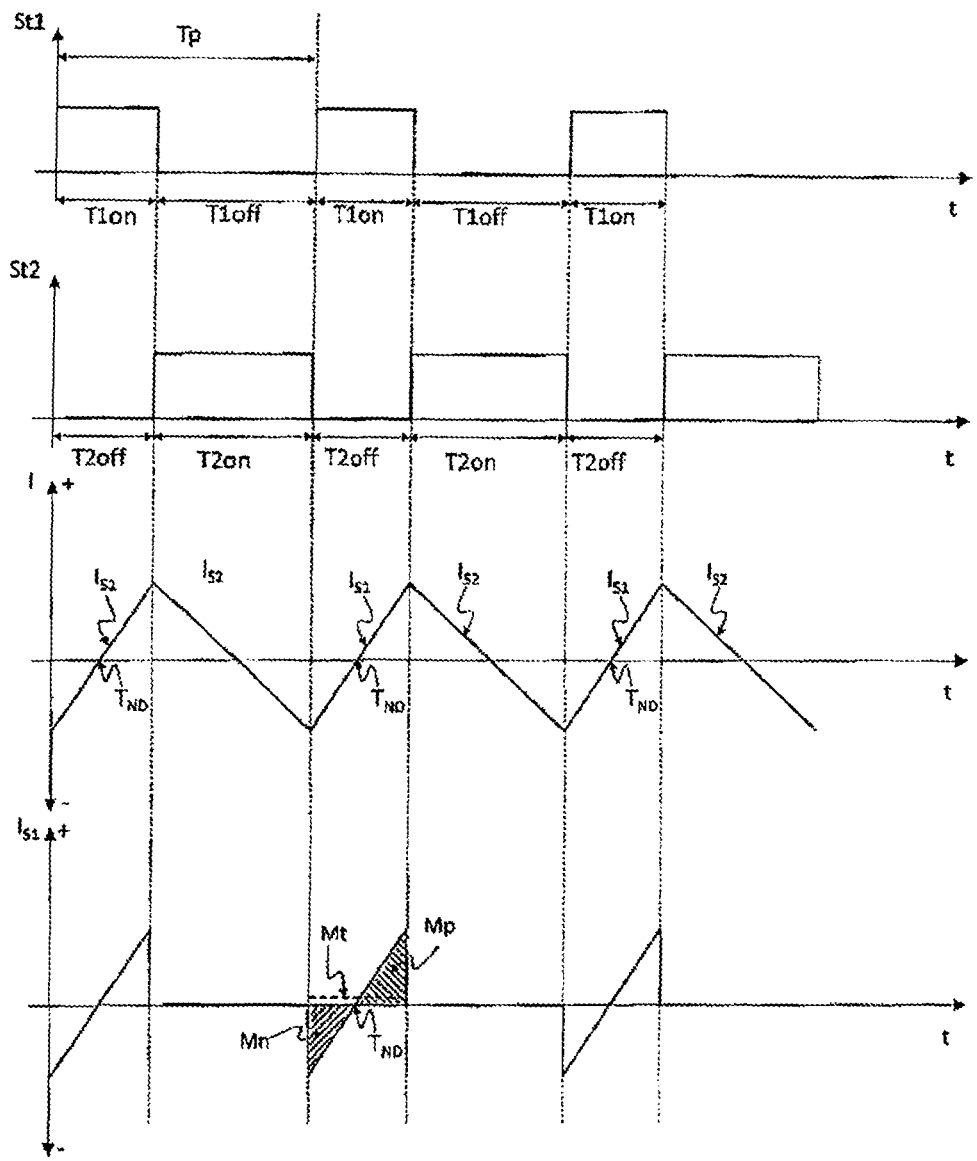
FIG. 3 an example of the control of the first and second switches of the first embodiment or second embodiment of the flyback converter circuit according to the invention in the synchronous operating mode and the resulting time curves of the switch current flowing through the first switch and of the current flowing through the second switch.

FIG. 3 schematically shows an example of the control of the first and second switches of the first embodiment or second embodiment of the flyback converter circuit according to the invention in the synchronous operating mode and the resulting time curves of the switch current flowing through the first switch and the current flowing through the second switch.

As can be seen from FIG. 3, the first switch S1, to which the control signal St1 is fed from the control unit 2, and the second switch S2, to which the control signal St2 is fed from the control unit 2, are controlled alternately and periodically by the control unit 2. That is to say, while the first switch S1 is switched on or switched to conductive by the corresponding control signal St1 at a high level (on duration T1on of the first switch S1), the second switch S2 is switched off or switched to non-conductive by the corresponding control signal St2 at a low level (off duration T2off of the second switch S2). While the second switch S2 is switched on or switched to conductive by the corresponding control signal St2 at a high level (on duration T2on of the second switch S2), the first switch S1 is switched off or switched to non-conductive by the corresponding control signal St1 at a low level (off duration T1off of the first switch S1).

The levels of the first control signal St1 and second control signal St2 for switching the first switch S1 and second switch S2 on and off can also be complementary to the example shown in FIG. 3.

When the first switch S1 and second switch S2 are operated in the synchronous operating mode, the on duration T2on of the second switch S2 is selected such that, during the on duration T2on of the second switch S2, the polarity of the current $I_{S2}$ flowing through the second switch S2 changes from a positive polarity to a negative polarity. Consequently, during the subsequent on duration T1on of the first switch S1, the switch current $I_{S1}$ flowing through the first switch S1 has a negative component and a positive component.

In particular, during the on duration T1on of the first switch S1, a negative switch current $I_{S1}$ flows first, followed by a positive switch current $I_{S1}$. With respect to a positive current, a negative current corresponds in particular to a current return flow. The time at which the polarity of the switch current $I_{S1}$ changes from a negative polarity (negative current) to a positive polarity (positive current) corresponds to the time TND of the zero crossing of the switch current $I_{S1}$.

During the alternating and periodic control of the first switch S1 and the second switch S2, during the period or period duration Tp, the first switch S1 is first switched on for an on duration T1on and is then switched off again for an off duration Ti off while the second switch S2 is controlled complementarily. Consequently, the second switch S2 is switched off during the on duration T1on of the first switch S1 and switched on again during the off duration T1off of the first switch S1.

The period Tp can also be selected differently (not shown in FIG. 3) so that, during the period Tp, the first switch S1 is switched off first for an off duration T1off and is then switched on again for an on duration T1on while the second switch S2 is controlled complementarily. Consequently, the second switch S2 is switched on during the off duration T1off of the first switch S1 and switched off again during the on duration T1on of the first switch S1.

FIG. 3 shows, only schematically and in particular without taking parasitic effects into consideration, the time curves of the control signals St1 and St2 for the control of the first switch S1 and second switch S2 in the synchronous operating mode and also the switch current $I_{S1}$ flowing through the switched-on or conductive first switch S1 and current $I_{S2}$ flowing through the switched-on or conductive second switch S2 resulting from the control.

Furthermore, FIG. 3 shows only a section of the time curves of the control signals St1 and St2 and also of the currents $I_{S1}$ and $I_{S2}$ during operation of the synchronous flyback converter circuit in the synchronous operating mode. The initial switching-on of the first switch S1 and second switch S2 from a non-operation of the synchronous flyback converter circuit is not shown in FIG. 3. In the case of an initial switching-on, the switch current $I_{S1}$ would not have a negative component. This does not occur until the on duration T2on of the second switch S2 is selected to be long enough for the polarity of the current $I_{S2}$ flowing through the second switch S2 to change from a positive polarity to a negative polarity. The secondary-side current Is with a negative polarity or the negative secondary-side current $I_{S2}$ corresponds here in particular to a current return flow.

By means of the synchronous operating mode, a very small temporal mean of the secondary-side current $I_{S2}$ which flows through the second switch S2 during the on duration T2on of the second switch S2, and consequently also a very small temporal mean of the primary-side switch current $I_{S1}$ which flows through the first switch S1 during the on duration T1on of the first switch S1 can be achieved.

This is schematically shown in the bottom graph in FIG. 3, which show schematically only the time curve of the primary-side switch current Isl. Due to the synchronous operating mode, the switch current $I_{S1}$ has a negative component and a positive component. The temporal mean Mt of the switch current $I_{S1}$ corresponds to the combination of the temporal mean Mn of the negative component of the switch current $I_{S1}$ with the temporal mean Mp of the positive component of the switch current $I_{S1}$.

Since the temporal mean Mt of the switch current $I_{S1}$ can become very small due to the synchronous operating mode, a direct capture of this temporal mean Mt would not represent the actual mean of the switch current $I_{S1}$ or would only do so if an expensive and complex detection circuit were to be used for this purpose. Otherwise, the noise occurring during capture would falsify the directly captured temporal mean of the switch current $I_{S1}$.

In contrast to the very small temporal mean Mt of the switch current $I_{S1}$, which in the synchronous operating mode can be achieved by a negative component of the switch current $I_{S1}$, the temporal mean Mn of the negative component of the switch current $I_{S1}$ and the temporal mean Mp of the positive component of the switch current $I_{S1}$ are large and are therefore not falsified by noise occurring during capture.

Consequently, according to the invention, the temporal mean Mn of the negative component of the switch current $I_{S1}$ and the temporal mean Mp of the positive component of the switch current $I_{S1}$ are determined separately (first embodiment) or captured separately (second embodiment) in order to then ascertain, in particular determine, the temporal mean Mt of the switch current $I_{S1}$ by combining the temporal mean Mn of the negative component of the switch current $I_{S1}$ and the temporal mean Mp of the positive component of the switch current $I_{S1}$. Since the temporal mean Mt of the switch current $I_{S1}$ determined in this way was not falsifiable by noise and consequently corresponds to the actual temporal mean of the switch current $I_{S1}$, this determined temporal mean of the switch current $I_{S1}$ is referred to as the actual temporal mean of the switch current $I_{S1}$.

As can be seen from FIG. 3, the temporal mean Mt of the switch current $I_{S1}$ corresponds in particular to the switch current $I_{S1}$ which flows through the first switch S1 on the temporal average during the on duration T1on of the first switch S1. The temporal mean Mt of the switch current $I_{S1}$ thus corresponds in particular to the average current which flows through the first switch S1 during the on duration T1on of the first switch S1.

The invention claimed is:

1. A synchronous flyback converter circuit (1) for operating an illuminant line (4) with at least one illuminant (5), in particular with at least one light-emitting diode, wherein the synchronous flyback converter circuit (1) comprises:
   a transformer (T) having a primary winding (Np), which is electrically connected to a first switch (S1), and a secondary winding (Ns), which is electrically connected to an output (A1, A1') of the synchronous flyback converter circuit (1) via a second switch (S2), the illuminant line (4) being connectable to the output (A1, A1');
   a control unit (2) designed to control the first switch (S1) and second switch (S2); and
   a detection circuit (3);

wherein the transformer (T) galvanically isolates a primary side (PS) of the synchronous flyback converter circuit (1), on which the primary winding (Np), the first switch (S1), the control unit (2) and the detection circuit (3) are arranged, from a secondary side (SS) of the synchronous flyback converter circuit (1), on which the secondary winding (Ns), the second switch (S2) and the output (A1, A1') are arranged; and wherein the detection circuit (3) is designed to
separately capture a temporal mean of the positive component of the switch current ($I_{S1}$) flowing through the first switch (S1) and a temporal mean of the negative component of the switch current ($I_{S1}$) flowing through the first switch (S1); and feed a first signal (Sg1) representing the temporal mean of the negative component of the switch current ($I_{S1}$) and a second signal (Sg2) representing the temporal mean of the positive component of the switch current ($I_{S1}$) to the control unit (2).

2. The synchronous flyback converter circuit (1) according to claim 1, wherein
the detection circuit (3) has two detection branches (EZ1, EZ2);
a first detection branch (EZ1) of the two detection branches (EZ1, EZ2) is designed to capture the temporal mean of the negative component of the switch current ($I_{S1}$) and to feed the first signal (Sg1) representing this temporal mean to the control unit (2); and
a second detection branch (EZ2) of the two detection branches (EZ1, EZ2) is designed to capture the temporal mean of the positive component of the switch current ($I_{S1}$) and to feed the second signal (Sg2) representing this temporal mean to the control unit (2).

3. The synchronous flyback converter circuit (1) according to claim 1, wherein
the first detection branch (EZ1) has a first diode (D1), the cathode of which is electrically connected to the first switch (S1) in such a way that only the negative component of the switch current ($I_{S1}$) flowing through the first switch (S1) can flow through the first detection branch (EZ1); and
the second detection branch (EZ2) has a second diode (D2), the anode of which is electrically connected to the switch (S1) in such a way that only the positive component of the switch current ($I_{S1}$) flowing through the first switch (S1) can flow through the second detection branch (EZ2).

4. The synchronous flyback converter circuit (1) according to claim 3, wherein
the first detection branch (EZ1) has a first capacitor (C1a) which is electrically connected to the anode of the first diode (D1) in such a way that it is charged by the negative component of the switch current ($I_{S1}$) flowing through the first switch (S1);
the second detection branch (EZ2) has a second capacitor (C1b) which is electrically connected to the cathode of the second diode (D2) in such a way that it is charged by the positive component of the switch current ($I_{S1}$) flowing through the first switch (S1); and
the first signal (Sg1) is a voltage ($U_{C1a}$) output by the first capacitor (C1a) and the second signal (Sg2) is a voltage ($U_{C1b}$) output by the second capacitor (C1b).

5. The synchronous flyback converter circuit (1) according to claim 4, wherein
the first capacitor (C1a) is a component of a first low-pass filter (TP1) and the second capacitor (C1b) is a component of a second low-pass filter (TP2).

6. The synchronous flyback converter circuit according to claim 3, wherein
the first diode (D1) and the second diode (D2) are arranged in the same housing.

7. The synchronous flyback converter circuit (1) according to claim 1, wherein
the control unit (2) is designed to switch on the first switch (S1) and second switch (S2) alternately such that, during the on duration (T2on) of the second switch (S2), the polarity of the current ($I_{S2}$) flowing through the second switch (S2) changes from a positive polarity to a negative polarity so that during the subsequent on duration (T1on) of the first switch (S1), the switch current ($I_{S1}$) flowing through the first switch (S1) has a negative component and a positive component.

8. The synchronous flyback converter circuit (1) according to claim 1, wherein
the control unit (2) is designed to determine the actual temporal mean (Mt) of the switch current ($I_{S1}$) by combining the temporal mean (Mp) of the positive component of the switch current ($I_{S1}$) with the temporal mean (Mn) of the negative component of the switch current ($I_{S1}$).

9. A method for operating a synchronous flyback converter circuit (1), for an illuminant line (4) with at least one light-emitting diode, wherein the synchronous flyback converter circuit (1) comprises:
a transformer (T) having a primary winding (Np), which is electrically connected to a first switch (S1), and a secondary winding (Ns), which is electrically connected to an output (A1, A1') of the synchronous flyback converter circuit (1) via a second switch (S2), the illuminant line (4) being connectable to the output (A1, A1');
a control unit (2) designed to control the first switch (S1) and second switch (S2); and
a detection circuit (3) designed to capture a temporal mean of the switch current ($I_{S1}$) flowing through the first switch (S1) and to feed at least one signal (Sg) representing this temporal mean to the control unit (2);
wherein the transformer (T) galvanically isolates a primary side (PS) of the synchronous flyback converter circuit (1), on which the primary winding (Np), the first switch (S1), the control unit (2) and the detection circuit (3) are arranged, from a secondary side (SS) of the synchronous flyback converter circuit (1), on which the secondary winding (Ns), the second switch (S2) and the output (A1, A1') are arranged; and
wherein the control unit (2) is designed to separately determine a temporal mean of the positive component of the switch current ($I_{S1}$) flowing through the first switch (S1) and a temporal mean of the negative component of the switch current ($I_{S1}$) flowing through the first switch (S1) on the basis of the signal (Sg) fed from the detection circuit (3); and
the method comprises the following steps:
separately capturing, with the detection circuit (3), a temporal mean of the positive component of the switch current ($I_{S1}$) flowing through the first switch (S1) and a temporal mean of the negative component of the switch current ($I_{S1}$) flowing through the first switch (S1); and
feeding, with the detection circuit (3), a first signal (Sg1) representing the temporal mean of the negative component of the switch current ($I_{S1}$) and a second signal (Sg2) representing the temporal mean of the positive component of the switch current ($I_{S1}$) to the control unit (2).

10. A luminaire, with the synchronous flyback converter circuit (1) according to claim 1, and an illuminant line (4) having at least one illuminant (5), in particular having at least one light-emitting diode; wherein the synchronous flyback converter circuit (1) is designed to provide on the output side an output voltage for operating the illuminant line (4), from an input voltage fed on the input side.

11. The method for operating a synchronous flyback converter circuit (1) according to claim 9, the method comprising the following step: separately determining, with the control unit (2), a temporal mean of the positive component of the switch current ($I_{S1}$) flowing through the first switch and a temporal mean of the negative component of the switch current ($I_{S1}$) flowing through the first switch on the basis of the signal (Sg) fed from the detection circuit (3).

* * * * *